US012732899B2

(12) United States Patent
Sun

(10) Patent No.: US 12,732,899 B2
(45) Date of Patent: Sep. 8, 2026

(54) NETWORK SLICING-BASED RANDOM ACCESS METHOD AND APPARATUS, AND STORAGE MEDIUM

(71) Applicant: Huawei Technologies Co., Ltd., Shenzhen (CN)

(72) Inventor: Fei Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 18/422,318

(22) Filed: Jan. 25, 2024

(65) Prior Publication Data

US 2024/0163777 A1 May 16, 2024

Related U.S. Application Data

(63) Continuation of application No. PCT/CN2022/107673, filed on Jul. 25, 2022.

(30) Foreign Application Priority Data

Jul. 26, 2021 (CN) ......................... 202110847500.9

(51) Int. Cl.
*H04W 48/16* (2009.01)
*H04W 74/0833* (2024.01)

(52) U.S. Cl.
CPC ....... *H04W 48/16* (2013.01); *H04W 74/0833* (2013.01)

(58) Field of Classification Search
CPC .......................... H04W 48/16; H04W 74/0833
See application file for complete search history.

(56) References Cited

U.S. PATENT DOCUMENTS

2017/0079059 A1* 3/2017 Li ......................... H04W 16/02
2018/0184413 A1* 6/2018 Rong .................... H04W 76/10
2018/0368204 A1* 12/2018 Park ...................... H04L 5/0048
2021/0068073 A1* 3/2021 Sivavakeesar ........ H04W 68/00

FOREIGN PATENT DOCUMENTS

CN 112913319 A 6/2021
EP 3739963 A1 11/2020
WO 2017074486 A1 5/2017

* cited by examiner

*Primary Examiner* — Kent Krueger
(74) *Attorney, Agent, or Firm* — Slater Matsil, LLP

(57) ABSTRACT

In accordance with an embodiment, a method includes: receiving downlink control information comprising at least one piece of information of the following: an identifier of a first slice, an identifier of a first slice group, a random access resource configuration index corresponding to the first slice, or a random access resource configuration index corresponding to the first slice group; and receiving a random access response in response to a second slice or a second slice group that the terminal requests to access corresponding to the at least one piece of information comprised in the downlink control information, where the random access response corresponds to the first slice, the first slice group, the random access resource configuration index of the first slice, or the random access resource configuration index of the first slice group.

19 Claims, 9 Drawing Sheets

| DCI format 1_0 |
| --- |
| > Frequency-domain resource configuration |
| > Time-domain resource configuration |
| … |
| > Reserved bits |

NETWORK SLICING-BASED RANDOM ACCESS METHOD AND APPARATUS, AND STORAGE MEDIUM

CROSS-REFERENCE TO RELATED APPLICATIONS

This application is a continuation of International Application No. PCT/CN2022/107673, filed on Jul. 25, 2022, which claims priority to Chinese Patent Application No. 202110847500.9, filed on Jul. 26, 2021. The disclosures of the aforementioned applications are hereby incorporated by reference in their entireties.

TECHNICAL FIELD

This application relates to the field of communication technologies, and in particular, to a network slicing-based random access method and apparatus, and a storage medium.

BACKGROUND

After obtaining a configuration required for random access, a terminal may initiate an initial random access procedure. After network slicing ("slicing" for short) is introduced, different physical random access channel (PRACH) resources may be allocated to different slices or slice groups. Therefore, for network slicing-based random access, how to improve communication reliability when a plurality of terminals perform random access on different PRACH resources is a problem that needs to be resolved in this application.

SUMMARY

This application provides a network slicing-based random access method and apparatus, to improve communication reliability.

According to a first aspect, a network slicing-based random access method is provided. The method includes: A terminal receives downlink control information, where the downlink control information includes at least one piece of information of the following: an identifier of a first slice, an identifier of a first slice group, a random access resource configuration index corresponding to the first slice, or a random access resource configuration index corresponding to the first slice group, and a random access response corresponds to the first slice, the first slice group, the random access resource configuration index of the first slice, or the random access resource configuration index of the first slice group. The terminal receives the random access response if a second slice or a second slice group that the terminal requests to access corresponds to the at least one piece of information included in the downlink control information. In this aspect, when the terminal initiates random access based on network slicing, because a random access response corresponds to a slice, a slice group, a random access resource configuration index of the slice, or a random access resource configuration index of the slice group, the terminal may accurately identify a random access response for the terminal based on information about a slice or a slice group that the terminal requests to access, thereby improving communication reliability. Further, a network is accessed based on a random access resource configured by the network, to reduce an access delay.

In a possible implementation, the method further includes: The terminal receives a broadcast message, and the broadcast message includes a sequence number of a plurality of slices or sequence numbers of a plurality of slice groups; and that the terminal receives the random access response includes: The terminal receives the random access response, where the random access response includes media access control sub-protocol data units MAC sub-PDUs of random access responses corresponding to the plurality of slices or the plurality of slice groups. The terminal obtains, based on a sequence number of a slice that the terminal requests to access in the plurality of slices or a sequence number of a slice group that the terminal requests to access in the plurality of slice groups, a MAC sub-PDU of a random access response corresponding to the slice or the slice group that the terminal requests to access. In this implementation, the random access response includes the random access responses corresponding to the plurality of slices or the plurality of slice groups. Therefore, the random access response corresponding to the slice or the slice group that the terminal requests to access may be accurately identified based on the sequence numbers of the plurality of slices that are broadcast or the sequence numbers of the plurality of slice groups that are broadcast, thereby improving communication reliability. Further, the MAC sub-PDU of the random access response corresponding to the slice or slice group that the terminal requests to access may be accurately obtained.

According to a second aspect, a network slicing-based random access method is provided. The method includes: An access network device sends downlink control information, where the downlink control information includes at least one piece of information of the following: an identifier of a first slice, an identifier of a first slice group, a random access resource configuration index corresponding to the first slice, or a random access resource configuration index corresponding to the first slice group, and a random access response corresponds to the first slice, the first slice group, the random access resource configuration index of the first slice, or the random access resource configuration index of the first slice group. The access network device sends the random access response. In this aspect, when a terminal initiates random access based on network slicing, the access network device sends the downlink control information and the random access response. The random access response corresponds to information about a slice or a slice group, so that the terminal may accurately identify a random access response based on information about a slice or a slice group that the terminal requests to access, thereby improving communication reliability.

In a possible implementation, the method further includes: The access network device sends a broadcast message, the broadcast message includes sequence numbers of a plurality of slices or sequence numbers of a plurality of slice groups, and the random access response includes media access control sub-protocol data units MAC sub-PDUs of random access responses corresponding to the plurality of slices or the plurality of slice groups. In this implementation, the access network device pre-broadcasts the sequence numbers of the plurality of slices or the sequence numbers of the plurality of slice groups. The random access response sent by the access network device includes the random access responses corresponding to the plurality of slices or the plurality of slice groups. Therefore, the terminal may accurately identify, based on the sequence numbers of the plurality of slices or the sequence numbers of the plurality of slice groups in the received broadcast message, a random access response corresponding to the slice or the slice group that the terminal requests to access, thereby improving the communication reliability. Further, the terminal may accurately obtain a MAC sub-PDU of the random access response corresponding to the slice or slice group that the terminal requests to access.

According to a third aspect, a network slicing-based random access method is provided. The method includes: A terminal sends a random access preamble, where the random access preamble corresponds to a first random access preamble identifier. The terminal receives a random access response, where the random access response includes a second random access preamble identifier, and the second random access preamble identifier is obtained by scrambling the first random access preamble identifier. The terminal descrambles the second random access preamble identifier, to obtain a third random access preamble identifier. When the third random access preamble identifier is the first random access preamble identifier, the terminal determines that the random access response is sent to the terminal. In this aspect, for a slice terminal, the second random access preamble identifier in the random access response is scrambled, so that the terminal may accurately identify the random access response based on a scrambled second random access preamble identifier in the random access response, thereby improving communication reliability. Further, a network is accessed based on a random access resource configured by the network, to reduce an access delay.

In a possible implementation, the first random access preamble identifier is scrambled by using a slice type communication identifier, and the slice type communication identifier indicates that the terminal requests to perform slice communication. In this implementation, the first random access preamble identifier is scrambled by using the slice type communication identifier, to obtain the second random access preamble identifier, so that a random access response for a slice type terminal or a non-slice type terminal may be accurately identified.

In another possible implementation, the first random access preamble identifier is scrambled by using slice associated information, and the slice associated information includes a slice identifier or a slice group identifier. In this implementation, the first random access preamble identifier is scrambled by using the slice associated information, to obtain the second random access preamble identifier, so that random access responses for different slice or slice group terminals may be accurately identified.

In another possible implementation, the second random access preamble identifier is obtained by scrambling the first random access preamble identifier by using a specified scrambling algorithm. In this implementation, an access network device and the terminal may configure a plurality of scrambling algorithms. When the access network device finds that a new conflict is caused by using a default scrambling algorithm, the specified scrambling algorithm is selected to reduce a conflict. The terminal may descramble the second random access preamble by using a descrambling algorithm corresponding to the specified scrambling algorithm. In another possible implementation, that the terminal descrambles the second random access preamble identifier, to obtain a third random access preamble identifier includes: The terminal descrambles the second random access preamble identifier based on slice associated information corresponding to the terminal, to obtain the third random access preamble identifier.

In another possible implementation, the method further includes: The terminal receives downlink control information, where the downlink control information indicates to scramble the first random access preamble identifier. In this implementation, the downlink control information indicates to scramble the first random access preamble identifier, so that a slice type terminal may accurately descramble the second random access preamble identifier, and accurately receive a random access response for the terminal.

In another possible implementation, the downlink control information indicates the specified scrambling algorithm. In this implementation, the downlink control information indicates a scrambling algorithm currently used by the terminal, and the terminal may accurately descramble, based on the indicated scrambling algorithm, a random access preamble identifier carried in the random access response.

According to a fourth aspect, a network slicing-based random access method is provided. The method includes: An access network device receives a random access preamble, where the random access preamble corresponds to a first random access preamble identifier. The access network device generates a random access response, where the random access response includes a second random access preamble identifier, and the second random access preamble identifier is obtained by scrambling the first random access preamble identifier. The access network device sends the random access response. In this implementation, for a slice terminal, the access network device scrambles the second random access preamble identifier in the random access response, so that the terminal may accurately identify the random access response, thereby improving communication reliability. Further, a network is accessed based on a random access resource configured by the network, to reduce an access delay.

In a possible implementation, the first random access preamble identifier is scrambled by using a slice type communication identifier, and the slice type communication identifier indicates that the terminal requests to perform slice communication. In this implementation, the first random access preamble identifier is scrambled by using the slice type communication identifier, to obtain the second random access preamble identifier, so that a random access response for a slice type terminal or a non-slice type terminal may be accurately identified.

In another possible implementation, the first random access preamble identifier is scrambled by using slice associated information, and the slice associated information includes a slice identifier or a slice group identifier. In this implementation, the first random access preamble identifier is scrambled by using the slice associated information, to obtain the second random access preamble identifier, so that random access responses for different slice or slice group terminals may be accurately identified.

In another possible implementation, the second random access preamble identifier is obtained by scrambling the first random access preamble identifier by using a specified scrambling algorithm. In this implementation, the access network device and a terminal may configure a plurality of scrambling algorithms. When the access network device finds that a new conflict is caused by using a default scrambling algorithm, the specified scrambling algorithm is selected to reduce a conflict.

In another possible implementation, the method further includes: The access network device sends downlink control information, where the downlink control information indicates to scramble the first random access preamble identifier. In this implementation, the downlink control information indicates to scramble the first random access preamble identifier, so that a slice type terminal may accurately descramble the second random access preamble identifier, and accurately receive a random access response for the terminal.

In another possible implementation, the downlink control information indicates the specified scrambling algorithm. In this implementation, the downlink control information indicates a scrambling algorithm currently used by the terminal, and the terminal may accurately descramble, based on the indicated scrambling algorithm, a random access preamble identifier carried in the random access response.

According to a fifth aspect, a network slicing-based random access apparatus is provided, to implement the network slicing-based random access method in the first aspect. For example, the network slicing-based random access apparatus may be a chip or a terminal. The foregoing method may be implemented by software, hardware, or hardware executing corresponding software.

In a possible implementation, the network slicing-based random access apparatus may include: a transceiver unit and a processing unit. The transceiver unit is configured to receive downlink control information, where the downlink control information includes at least one piece of information of the following: an identifier of a first slice, an identifier of a first slice group, a random access resource configuration index corresponding to the first slice, or a random access resource configuration index corresponding to the first slice group. A random access response corresponds to the first slice, the first slice group, the random access resource configuration index of the first slice, or the random access resource configuration index of the first slice group. The transceiver unit is further configured to receive the random access response if a second slice or a second slice group that the terminal requests to access corresponds to the at least one piece of information included in the downlink control information.

In a possible implementation, the transceiver unit is further configured to receive a broadcast message, and the broadcast message includes sequence numbers of a plurality of slices or sequence numbers of a plurality of slice groups. The transceiver unit is further configured to receive the random access response, where the random access response includes media access control sub-protocol data units MAC sub-PDUs of random access responses corresponding to the plurality of slices or the plurality of slice groups. The processing unit is configured to obtain, based on a sequence number of a slice that the terminal requests to access in the plurality of slices or a sequence number of a slice group that the terminal requests to access in the plurality of slice groups, a MAC sub-PDU of a random access response corresponding to the slice or the slice group that the terminal requests to access.

According to a sixth aspect, a network slicing-based random access apparatus is provided, to implement the network slicing-based random access method in the second aspect. For example, the network slicing-based random access apparatus may be a chip or an access network device. The foregoing method may be implemented by software, hardware, or hardware executing corresponding software.

In a possible implementation, the network slicing-based random access apparatus may include: a transceiver unit and a processing unit. The transceiver unit is configured to send downlink control information, where the downlink control information includes at least one piece of information of the following: an identifier of a first slice, an identifier of a first slice group, a random access resource configuration index corresponding to the first slice, or a random access resource configuration index corresponding to the first slice group. A random access response corresponds to the first slice, the first slice group, the random access resource configuration index of the first slice, or the random access resource configuration index of the first slice group. The transceiver unit is further configured to send the random access response.

In a possible implementation, the transceiver unit is further configured to send a broadcast message, the broadcast message includes sequence numbers of a plurality of slices or sequence numbers of a plurality of slice groups, and the random access response includes media access control sub-protocol data units MAC sub-PDUs of random access responses corresponding to the plurality of slices or the plurality of slice groups.

According to a seventh aspect, a network slicing-based random access apparatus is provided, to implement the network slicing-based random access method in the third aspect. For example, the network slicing-based random access apparatus may be a chip or a terminal. The foregoing method may be implemented by software, hardware, or hardware executing corresponding software.

In a possible implementation, the network slicing-based random access apparatus may include: a transceiver unit and a processing unit. The transceiver unit is configured to send a random access preamble, where the random access preamble corresponds to a first random access preamble identifier. The transceiver unit is further configured to receive a random access response, where the random access response includes a second random access preamble identifier, and the second random access preamble identifier is obtained by scrambling the first random access preamble identifier. The processing unit is configured to descramble the second random access preamble identifier, to obtain a third random access preamble identifier. The processing unit is further configured to: when the third random access preamble identifier is the first random access preamble identifier, determine that the random access response is sent to the processing unit.

In a possible implementation, the first random access preamble identifier is scrambled by using a slice type communication identifier, and the slice type communication identifier indicates that the terminal requests to perform slice communication.

In another possible implementation, the first random access preamble identifier is scrambled by using slice associated information, and the slice associated information includes a slice identifier or a slice group identifier.

In another possible implementation, the processing unit is further configured to descramble the second random access preamble identifier based on slice associated information corresponding to the processing unit, to obtain the third random access preamble identifier.

In another possible implementation, the transceiver unit is further configured to receive downlink control information, where the downlink control information indicates to scramble the first random access preamble identifier.

According to an eighth aspect, a network slicing-based random access apparatus is provided, to implement the network slicing-based random access method in the fourth aspect. For example, the network slicing-based random access apparatus may be a chip or an access network device. The foregoing method may be implemented by software, hardware, or hardware executing corresponding software.

In another possible implementation, the network slicing-based random access apparatus may include: a transceiver unit and a processing unit. The transceiver unit is configured to receive a random access preamble, where the random access preamble corresponds to a first random access preamble identifier. The processing unit is configured to generate a random access response, where the random access response includes a second random access preamble identifier, and the second random access preamble identifier is obtained by scrambling the first random access preamble identifier. The transceiver unit is further configured to send the random access response.

In a possible implementation, the first random access preamble identifier is scrambled by using a slice type communication identifier, and the slice type communication identifier indicates that a terminal requests to perform slice communication.

In another possible implementation, the first random access preamble identifier is scrambled by using slice associated information, and the slice associated information includes a slice identifier or a slice group identifier.

In another possible implementation, the transceiver unit is further configured to send downlink control information, where the downlink control information indicates to scramble the first random access preamble identifier.

In a possible implementation, the network slicing-based random access apparatus in the fifth aspect to the eighth aspect includes a processor coupled to a memory, and the processor is configured to support the apparatus in performing a corresponding function in the network slicing-based random access method. The memory is configured to be coupled to the processor, and stores a program (instructions) necessary for the apparatus and/or data necessary for the apparatus. Optionally, the network slicing-based random access apparatus may further include a communication interface, configured to support communication between the apparatus and another network element. Optionally, the memory may be located inside the network slicing-based random access apparatus, or may be located outside the network slicing-based random access apparatus.

In another possible implementation, the network slicing-based random access apparatus in the fifth aspect to the eighth aspect includes: a processor and a transceiver apparatus. The processor is coupled to the transceiver apparatus, and the processor is configured to execute a computer program or instructions, to control the transceiver apparatus to receive and send information. When the processor executes the computer program or the instructions, the processor is further configured to implement the foregoing method by using a logic circuit or by executing code instructions. The transceiver apparatus may be a transceiver, a transceiver circuit, or an input/output interface, and is configured to receive a signal from another network slicing-based random access apparatus other than the network slicing-based random access apparatus, and transmit the signal to the processor, or send a signal from the processor to the another network slicing-based random access apparatus other than the network slicing-based random access apparatus. When the network slicing-based random access apparatus is a chip, the transceiver apparatus is a transceiver circuit or an input/output interface.

When the network slicing-based random access apparatus in the fifth aspect to the eighth aspect is a chip, a sending unit may be an output unit, for example, an output circuit or a communication interface, and a receiving unit may be an input unit, for example, an input circuit or a communication interface. When the network slicing-based random access apparatus is a terminal, a sending unit may be a transmitter or a transmitter machine, and a receiving unit may be a receiver or a receiver machine.

According to a ninth aspect, a computer-readable storage medium is provided. The computer-readable storage medium stores a computer program or instructions. When the computer program or the instructions are executed, the method in any one of the foregoing aspects is implemented.

According to a tenth aspect, a computer program product including instructions is provided. When the instructions are run on a network slicing-based random access apparatus, the network slicing-based random access apparatus is enabled to perform the method in any one of the foregoing aspects.

According to an eleventh aspect, a communication system is provided. The communication system includes the network slicing-based random access apparatus in the fifth aspect and the network slicing-based random access apparatus in the sixth aspect.

According to a twelfth aspect, a communication system is provided. The communication system includes the network slicing-based random access apparatus in the seventh aspect and the network slicing-based random access apparatus in the eighth aspect.

DETAILED DESCRIPTION OF THE EMBODIMENTS

Figure 1:
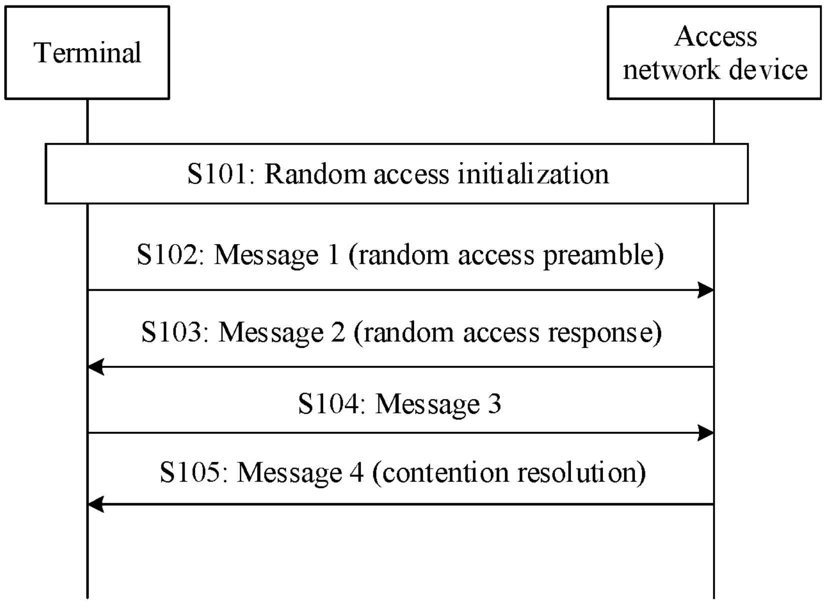
FIG. 1 is a schematic diagram of a 4-step random access procedure.

The following describes embodiments of this application with reference to the accompanying drawings in embodiments of this application.

First, several terms involved in embodiments of this application are described.

Network Slicing

With development of mobile communication technologies, various new services and application scenarios continuously emerge, and requirements of these services on network functions, connection performance, security, and the like are greatly different. If a single network is used to carry these services, it is quite difficult to meet requirements on high bandwidth, a low delay, high reliability, and the like. In addition, building a new network for each service brings huge costs. This requires that a 5th generation (5G) mobile communication system should be flexible and scalable, and can meet different service requirements. Therefore, end-to-end network slicing is used in 5G to provide users with customized network services. Specifically, through flexible allocation of network resources and on-demand networking, a plurality of isolated logical subnets with different characteristics are virtualized on a same physical infrastructure in 5G, to provide targeted services for users.

Random Access Procedure (Random Access Procedure)

After cell search, a terminal has achieved downlink synchronization with a cell. Therefore, the terminal can receive downlink data. However, the terminal can perform uplink transmission only after achieving uplink synchronization with the cell. The terminal establishes a connection to the cell and achieves uplink synchronization through a random access procedure.

In a mobile communication system, a random access procedure usually needs to be performed in the following cases: a terminal initially accesses a cell, and switches from an idle state to a connected state; a radio resource control (RRC) connection is re-established after a wireless connection is interrupted; during cell handover, a terminal needs to establish uplink synchronization with a target cell; when a terminal is in the connected state but the terminal is not in uplink synchronization, and uplink or downlink data arrives in this case, uplink synchronization needs to be established through random access; user positioning is performed based on uplink measurement; and when no dedicated scheduling request resource is allocated on a physical uplink control channel (PUCCH), an uplink resource is requested through random access.

With further discussion of a 5G new radio (NR) system, a new scenario may be introduced for random access. For example, downlink data arrives in a case of an inactive state, and uplink synchronization is not established in this case; uplink data arrives in a case of an inactive state, and uplink synchronization is not established in this case; an inactive state is changed; a terminal requests on-demand system information (SI); the terminal sends a beam failure recovery request; the terminal requests other system information (request for other SI); and the like.

Based on different service triggering manners, random access may be divided into contention-based random access (contention based random access procedure) and non-contention based random access (non-contention based random access procedure).

Contention-Based Random Access

A contention-based random access procedure may include a 4-step contention random access procedure (4-step RACH procedure) and a 2-step random access procedure (2-step RACH procedure).

FIG. 1 is a schematic diagram of a 4-step contention random access procedure (4-step RACH procedure). The procedure includes the following steps.

S101: Random access initialization.

A random access procedure is triggered by a physical downlink control channel (PDCCH) command, a media access control (MAC) sublayer, or an RRC sublayer. If a terminal receives PDCCH transmission that is scrambled by a cell radio network temporary identifier (cell-radio network temporary identifier, C-RNTI) and consistent with the PDCCH command, the random access procedure is triggered. The PDCCH command or an RRC message can indicate a random access preamble index (RA-Preamble index) (64 types in total) and a physical layer random access channel index (RA-PRACH-Mask index) (16 types in total) that are used in resource selection in the random access procedure.

The random access preamble index indicates a random access preamble for random access. When a value of the random access preamble index is 000000, random access is initiated by the MAC sublayer. To be specific, a random access preamble is selected by the MAC sublayer, and correspondingly, contention random access is performed. When the value of the random access preamble index is not 000000, the terminal performs random access by using the random access preamble indicated by the random access preamble index, that is, performs non-contention based random access. A physical layer physical access channel index indicates a specific subframe that is in a system frame and that corresponds to a PRACH on which the terminal may send a random access preamble. The terminal may search a correspondence table by using the physical layer random access channel index, to determine the random access preamble and an available physical resource.

Parameters need to be configured for random access initialization. The parameters include: a PRACH resource set (for example, PRACH-Config Index) that may be used to transmit the random access preamble; an available random access preamble group (group A or group B) and an available random access preamble set in each group; a maximum number of transmission (preamble trans-max) of the random access preamble; an initial transmit power of the random access preamble (preamble initial received target power); a power ramping step; a random access response window (RA-response window size); a maximum number of HARQ retransmission of a third message (Msg3) (max HARQ-Msg3); and a contention resolution timer (mac-contention resolution timer).

It should be noted that, before each random access procedure is triggered, all of the configured parameters may be updated through higher layer configuration. After obtaining the foregoing parameters, the terminal performs the following operations: clearing an Msg3 buffer; setting a quantity of times of sending the random access preamble (PREAMBLE_TRANSMISSION_COUNTER) to 1; and setting a backoff parameter value stored by the terminal to 0 ms, and entering a random access resource selection phase.

It should be further noted that the terminal performs only one random access procedure at any moment. If the terminal receives a newly initiated random access request in a random access procedure, whether to continue the ongoing random access procedure or start a new random access procedure is decided based on an implementation on a terminal side.

S102: The terminal sends the random access preamble to an access network device.

Specifically, the random access preamble is carried in a first message (Msg1). A main function of the random access preamble is to notify the access network device that there is a random access request, so that the access network device can estimate a transmission delay between the access network device and the terminal. In this way, the access network device may calibrate an uplink advance amount (uplink timing) and notify the terminal of calibration information by using a timing advance command.

The access network device obtains a random access preamble identifier (RAPID) and a downlink transmit beam by detecting the random access preamble, and estimates the transmission delay.

S103: The terminal receives a random access response (RAR) sent by the access network device.

The terminal may listen to a PDCCH by using a random access radio network temporary identifier (RA-RNTI). If the terminal receives downlink control information (DCI) belonging to the terminal, the terminal receives, on a physical downlink shared channel (PDSCH) based on the DCI, an RAR message delivered by the access network device. The DCI includes related content such as resource block (RB) allocation information and a modulation and coding scheme (MCS).

The random access response is carried in a second message (Msg2). After sending the random access preamble, the terminal listens to a corresponding PDCCH in an RAR response window (ra-ResponseWindow) based on an RA-RNTI value corresponding to the random access preamble. If a random access preamble carried in the response received by the terminal is consistent with the random access preamble sent in the Msg1, the terminal stops listening to the RAR. Specifically, the access network device may send the RAR to the terminal through the PDSCH.

The RAR includes an uplink timing advance amount, an uplink grant (UL grant) allocated to the third message (Msg3), a temporary cell radio network temporary identifier (TC-RNTI) allocated by a network side, and the like. The PDCCH carrying the downlink control information is scrambled by using the RA-RNTI.

It should be noted that if a plurality of terminals send random access preambles on a same PRACH resource (with a same time-frequency position), a plurality of corresponding RARs are multiplexed in a same media access control (MAC) protocol data unit (PDU).

S104: The terminal sends a message that is based on scheduled transmission, namely, a message 3 (Msg3), to the access network device.

The terminal sends the Msg3 to the access network device through a PUSCH based on uplink grant information and uplink timing advance amount information in the Msg2. Herein, content of the Msg3 may alternatively be different depending on different statuses of the terminal and different application scenarios.

Because the access network device sends the MAC PDU to the plurality of terminals in S103, RARs received by the terminals may be different, and correspondingly, behavior of the terminals may also be different. After listening and detecting an RAR for each terminal, each terminal may send an Msg3 to the access network device based on specific content included in the RAR.

S105: The terminal receives a contention resolution message sent by the access network device, namely, a fourth message (Msg4).

When the plurality of terminals initiate random access by using a same random access preamble, contention occurs. A maximum of one terminal in the terminals contending for a same resource can succeed in access. In this case, the access network device sends the contention resolution message to the terminal through the PDSCH.

Specifically, after sending the Msg3, the terminal starts a contention resolution timer (mac-contention resolution timer), and listens to the PDCCH by using the TC-RNTI indicated in the RAR, or the C-RNTI pre-configured by the access network device. If the terminal receives the contention resolution message sent by the access network device to the terminal before the contention resolution timer expires, it is determined that the random access procedure is successful.

The 2-step random access procedure may alternatively be referred to as 2-step random access (2-step RACH), or may be referred to as simplified random access (simplified RACH), flexible random access (flexible RACH), or another name. A name is not limited in this application.

Figure 2:
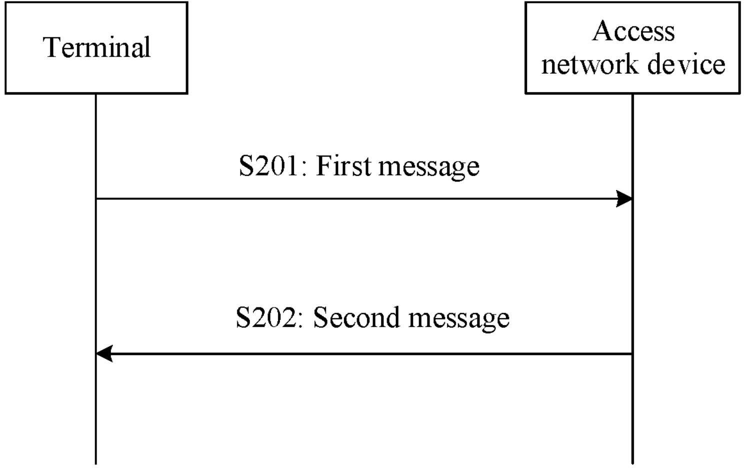
FIG. 2 is a schematic diagram of a 2-step random access procedure.

A specific procedure of the 2-step RACH is shown in FIG. 2 as follows: S201: The terminal first sends a first random access preamble (namely, a "message 1" in a 4-step RACH) and first data (namely, a "message 3" in the 4-step RACH). The first random access preamble and the first data may be adjacent/interleaved in terms of time and/or frequency, or there may alternatively be an interval between the first random access preamble and the first data in terms of time and/or frequency. S202: After receiving the first random access preamble and/or the first data, the access network device responds by using a message 2 and/or a message 4 in the 4-step RACH.

In this application, the first random access preamble and the first data that are sent by the terminal in the 2-step RACH may be collectively referred to as a first message. The first random access preamble may be referred to as a preamble part of the first message, and the first data may be referred to as a data part of the first message. Response messages (namely, the "message 2" and the "message 4" in the 4-step RACH) sent by the access network device in the 2-step RACH may be collectively referred to as a second message.

Non-Contention Based Random Access

Non-contention based random access uses a dedicated random access resource and a random access preamble, and no contention conflict exists. Therefore, the foregoing steps S104 and S105 do not need to be performed.

After network slicing is introduced, different PRACH resources are available for different slices (slice groups) in network slicing-based random access. However, this may cause an RA-RNTI collision problem. To be specific, slice UE (a terminal that supports network slicing) and non-slice UE (a terminal that does not support network slicing, or referred to as a conventional terminal), or UEs belonging to different slices (slice groups) may obtain a same RA-RNTI on different PRACH resources. Consequently, UE cannot identify whether an RAR sent by an access network device is for the UE. The problem is described in detail as follows:

After obtaining a configuration required for random access, the UE may initiate an initial random access procedure, and first needs to select a random access preamble resource. The random access preamble is scrambled by using an RA-RNTI. A calculation formula of the RA-RNTI is as follows:

$$\text{RA-RNTI}=1+s\_id+14\times t\_id+14\times 80\times f\_id+14\times 80\times 8\times ul\_carrier\_id$$, where s_id is a start symbol index (0≤s_id<14) of a PRACH, t_id is a start slot index (0≤t_id<80) of a PRACH in a system frame, fid is a position index (0≤s_id<8) of a PRACH in frequency domain, and ul_carrier_id is an uplink carrier (0=normal carrier, 1=SUL carrier) for sending an Msg1.

Different PRACH resources selected by the slice UE and the non-slice UE or the UEs belonging to different slices (slice groups) may correspond to same s_id, t_id, fid, and ul_carrier_id. According to the foregoing formula, RA-RNTIs obtained by the UEs through processing are the same. Furthermore, if these UEs select a same random access preamble, when receiving an Msg2, these UEs cannot identify an actual response object of the Msg2. As a result, some UEs send an Msg3 by using an uplink resource that is allocated by the access network device and that is for another UE, causing RACH confusion.

For example, UE_A and UE_B send a same random access preamble to the access network device on different PRACH resources (corresponding to a same RA-RNTI), and the access network device may distinguish, based on PRACH resource positions of the UE_A and the UE_B, service types requested by the two terminals. If the access network device determines to respond to the UE_A, the access network device sends DCI scrambled by using the RA-RNTI. Because RA-RNTIs of the two UEs are the same, the UE_B also uses the RA-RNTI for descrambling to obtain the DCI. Then, the UE_B also obtains an RAR on a corresponding PDSCH. Because the random access preambles of the two terminals are the same, the UE_B determines that the RAR is a response of the access network device for the UE_B. Finally, the UE_B occupies a resource for sending the message 3 by the UE_A.

How the access network device sends the Msg2 is specifically as follows: The access network device sends a DCI format 1_0 scrambled by using an RA-RNTI (the access network device may obtain a corresponding RA-RNTI by performing processing based on a resource position at which the UE sends the random access preamble). In an RAR response window, the UE listens to a PDCCH (DCI format 1_0) by using the RA-RNTI obtained through processing. If the UE listens and detects DCI scrambled by using the corresponding RA-RNTI, the UE receives an RAR on a PDSCH indicated by the DCI. If a RAPID in the RAR corresponds to the random access preamble sent by the UE, the RAR is successfully received. Then, the UE sends the Msg3 based on uplink scheduling information in the RAR.

Slice UE_A and non-slice UE_B (the UE_A and the UE_B may alternatively be different slice UEs or different slice group UEs) are used as an example. The UE_A and the UE_B send a same random access preamble to the access network device on different PRACH resources (with a same RA-RNTI). The access network device may distinguish, based on PRACH resource positions of the UE_A and the UE_B, service types requested by the two UEs. If the access network device determines to respond to the UE_A, the access network device sends DCI scrambled by using the RA-RNTI. Because RA-RNTIs of the two UEs are the same, the UE_B also uses the RA-RNTI for descrambling to obtain the DCI. Then, the UE_B also obtains an RAR on a corresponding PDSCH. Because the random access preambles of the two UEs are the same, the UE_B determines that the RAR is a response of the access network device for the UE_B. Finally, the UE_B occupies a resource of the Msg3 for the UE_A.

Figure 3:
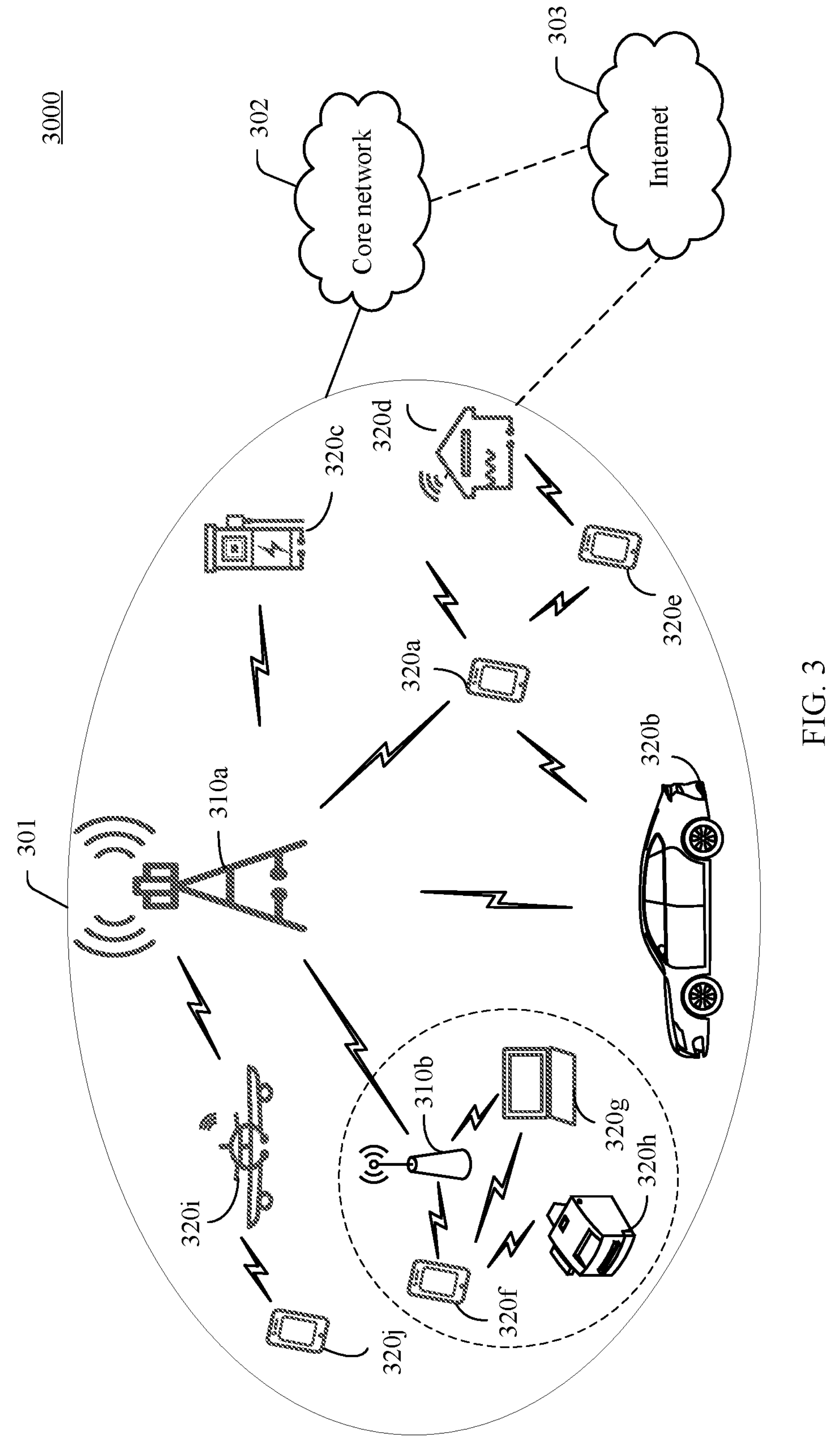
FIG. 3 is a schematic diagram of an architecture of a communication system to which an embodiment of this application is applied.

FIG. 3 is a schematic diagram of an architecture of a communication system 3000 to which embodiments of this application are applied. As shown in FIG. 3, the communication system includes a radio access network 301 and a core network 302. Optionally, the communication system 3000 may further include an internet 303. The radio access network 301 may include at least one radio access network device (for example, 310*a* and 310*b* in FIG. 3), and may further include at least one terminal (for example, 320*a* to 320*j* in FIG. 3). The terminal is connected to the radio access network device in a wireless manner, and the radio access network device is connected to the core network in a wireless or wired manner. A core network device and the radio access network device may be different independent physical devices, or functions of the core network device and logical functions of the radio access network device may be integrated into one physical device, or some functions of the core network device and some functions of the radio access network device may be integrated into one physical device. Terminals may be connected to each other in a wired or wireless manner, and radio access network devices may be connected to each other in a wired or wireless manner. FIG. 3 is merely a schematic diagram. The communication system may further include another access network device. For example, the communication system may further include a wireless relay device and a wireless backhaul device, which are not drawn in FIG. 3.

The radio access network device may be a base station, an evolved NodeB (eNodeB), a transmission reception point (TRP), a next-generation NodeB (next generation NodeB, gNB) in a 5th generation (5G) mobile communication system, a next-generation base station in a 6th generation (6G) mobile communication system, a base station in a future mobile communication system, an access node in a Wi-Fi system, or the like, or may be a module or a unit that performs some functions of a base station, for example, may be a central unit (CU) or a distributed unit (DU). The radio access network device may be a macro base station (for example, 310*a* in FIG. 3), or may be a micro base station or an indoor base station (for example, 310*b* in FIG. 3), or may be a relay node or a donor node. A specific technology and a specific device form used by the radio access network device are not limited in embodiments of this application.

The terminal may alternatively be referred to as a terminal device, user equipment (UE), a mobile station, a mobile terminal, or the like. The terminal may be widely used in various scenarios such as device-to-device (D2D), vehicle-to-everything (vehicle to everything, V2X) communication, machine-type communication (MTC), an internet of things (IOT), virtual reality, augmented reality, industrial control, autonomous driving, remote medical, a smart grid, a smart furniture, a smart office, a smart wearable device, smart transportation, and a smart city. The terminal may be a mobile phone, a tablet computer, a computer with a wireless transceiver function, a wearable device, a vehicle, an unmanned aerial vehicle, a helicopter, an airplane, a ship, a robot, a robot arm, a smart home device, or the like. A specific technology and a specific device form used by the terminal are not limited in embodiments of this application.

The access network device and the terminal may be at fixed positions, or may be mobile. The access network device and the terminal may be deployed on land, including an indoor or outdoor scenario and a hand-held or vehicle-mounted scenario, or may be deployed on water, or may be deployed on an airplane, a balloon, and an artificial satellite. An application scenario of the access network device and the terminal is not limited in embodiments of this application.

Roles of the access network device and the terminal may be relative to each other. For example, a helicopter or an unmanned aerial vehicle 320*i* in FIG. 3 may be configured as a mobile access network device. For a terminal 320*j* that accesses the radio access network 301 by using 320*i*, a terminal 320*i* is an access network device. However, for an access network device 310*a*, 320*i* is a terminal. To be specific, 310*a* and 320*i* communicate with each other by using a radio air interface protocol. Certainly, 310*a* and 320*i* may alternatively communicate with each other by using an interface protocol between access network devices. In this case, relative to 310*a*, 320*i* is also an access network device. Therefore, both the access network device and the terminal may be collectively referred to as a communication apparatus. 310a and 310b in FIG. 3 may be referred to as communication apparatuses having a function of an access network device, and 320a to 320j in FIG. 3 may be referred to as communication apparatuses having a function of a terminal.

Communication between the access network device and the terminal, between access network devices, and between terminals may be performed by using a licensed spectrum, or may be performed by using an unlicensed spectrum, or may be performed by using both a licensed spectrum and an unlicensed spectrum, or may be performed by using a spectrum below 6 gigahertz (GHz), or may be performed by using a spectrum above 6 GHz, or may be performed by using both a spectrum below 6 GHz and a spectrum above 6 GHz. A spectrum resource used by wireless communication is not limited in embodiments of this application.

In embodiments of this application, a function of the access network device may alternatively be performed by a module (for example, a chip) in the access network device, or may alternatively be performed by a control subsystem including a function of an access network device. The control subsystem including the function of the access network device may be a control center in the foregoing application scenarios such as a smart grid, industrial control, smart transportation, and a smart city. A function of the terminal may alternatively be performed by a module (for example, a chip or a modem) in the terminal, or may alternatively be performed by an apparatus including a function of a terminal.

In this application, the access network device sends a downlink signal or downlink information to the terminal, and the downlink information is carried on a downlink channel. The terminal sends an uplink signal or uplink information to the access network device, and the uplink information is carried on an uplink channel. To communicate with the access network device, the terminal needs to establish a wireless connection to a cell controlled by the access network device. A cell that establishes a wireless connection to the terminal is referred to as a serving cell of the terminal. When communicating with the serving cell, the terminal is further interfered by a signal from a neighboring cell.

In the foregoing scenario in which different PRACH resources are allocated to a plurality of UEs, but RA-RNTIs used to scramble downlink control information are the same, and the plurality of UEs may send a same random access preamble, the UE mistakenly considers that an RAR is sent to the UE, and therefore sends an Msg3 based on uplink scheduling information in the RAR. As a result, a random access resource configured by a network is occupied, and an access delay is increased. This application provides a network slicing-based random access solution. When the terminal initiates random access based on network slicing, because a random access response corresponds to a slice, a slice group, a random access resource configuration index of the slice, or a random access resource configuration index of the slice group, the terminal may accurately identify a random access response for the terminal based on information about a slice or a slice group that the terminal requests to access, thereby improving communication reliability. Further, a network is accessed based on a random access resource configured by the network, to reduce an access delay.

Figures 4, 5:
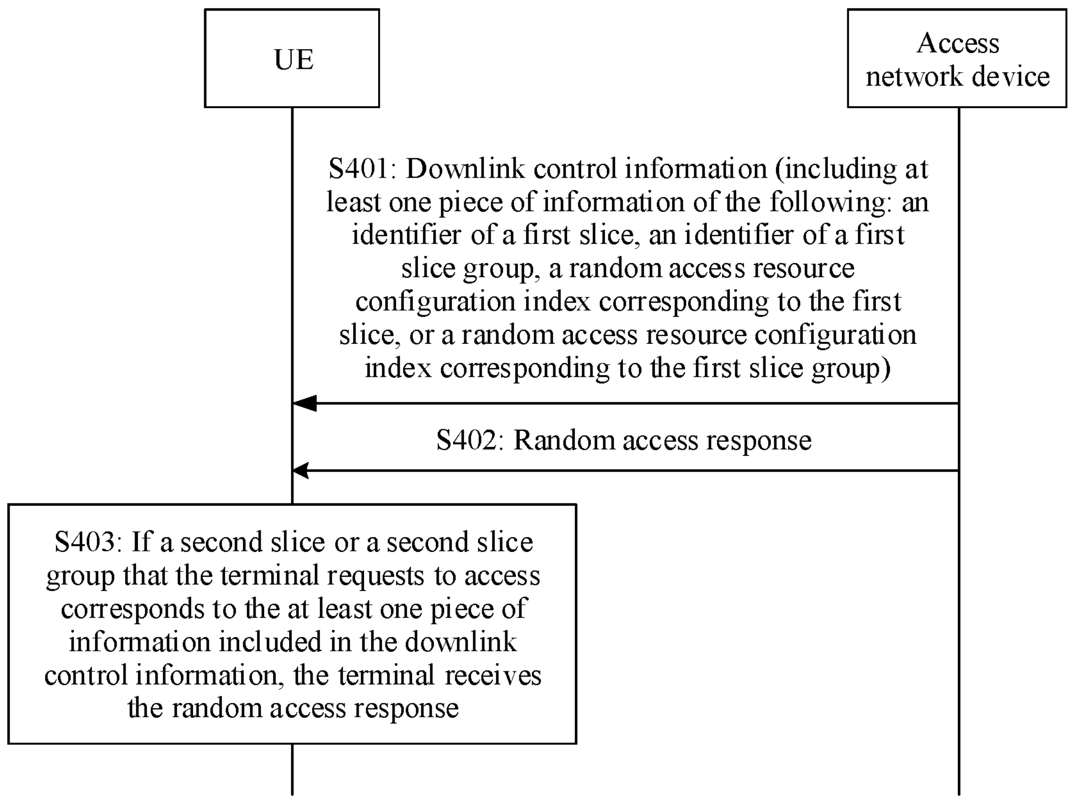
FIG. 4 is a schematic flowchart of a network slicing-based random access method according to an embodiment of this application.
FIG. 5 is a schematic diagram of a format of a DCI format 1_0.

FIG. 4 is a schematic flowchart of a network slicing-based random access method according to an embodiment of this application. The method includes the following steps.

S401: An access network device sends downlink control information. Correspondingly, UE receives the downlink control information.

The UE in this embodiment is slice UE, and the UE requests to access a slice or a slice group. A slice group is a group of slices formed based on a service type, a network resource, and the like. A slice has a unique slice identifier within a specific range, and a slice group has a unique slice group identifier within a specific range.

Before accessing the slice or the slice group, the UE initiates random access to achieve uplink synchronization with a cell. Before the UE initiates random access, the access network device performs random access resource configuration for the UE based on the slice (slice group) that the UE requests to access, and the access network device performs different random access resource configuration for different slices (slice groups). The random access resource configuration has a unique random access resource configuration index (prach-ConfigurationIndex). The random access resource configuration index corresponds to the slice (slice group) that the UE requests to access. Therefore, the UE sends a random access preamble to the access network device based on the random access resource configuration.

After receiving the random access preamble sent by the UE, the access network device may know, based on a random access resource position at which the UE sends the random access preamble, the slice (slice group) that the UE requests to access. If the access network device decides to respond to the UE, the access network device sends, to the UE on a PDCCH, downlink control information scrambled by using an RA-RNTI. The downlink control information indicates a time-frequency resource position of a PDSCH that carries an RAR.

In this embodiment, the downlink control information includes at least one piece of information of the following: an identifier of a first slice, an identifier of a first slice group, a random access resource configuration index corresponding to the first slice, or a random access resource configuration index corresponding to the first slice group. Optionally, the downlink control information may include one or more pieces of information of the following: the identifier of the first slice, the identifier of the first slice group, the random access resource configuration index corresponding to the first slice, or the random access resource configuration index corresponding to the first slice group. Optionally, the downlink control information may include one or more pieces of information of the following: identifiers of a plurality of slices, identifiers of a plurality of slice groups, random access resource configuration indexes corresponding to the plurality of slices, or random access resource configuration indexes corresponding to the plurality of slice groups.

The downlink control information may use any format, for example, a DCI format 1_0. A format of the DCI format 1_0 is shown in FIG. 5. For example, the foregoing information may be carried in reserved bits (Reserved bits) of the DCI format 1_0.

S402: The access network device sends a random access response.

The access network device sends, based on the time-frequency resource position of the PDSCH indicated by the downlink control information, the RAR at the time-frequency resource position. The RAR corresponds to the first slice, the first slice group, the random access resource configuration index of the first slice, or the random access resource configuration index of the first slice group.

S403: If a second slice or a second slice group that a terminal requests to access corresponds to the at least one piece of information included in the downlink control information, the terminal receives the random access response.

The UE descrambles the downlink control information based on an RA-RNTI obtained by processing based on the random access resource configuration. If the second slice or the second slice group that the terminal requests to access corresponds to the at least one piece of information included in the downlink control information, the terminal determines that the RAR is sent to the terminal, and receives the RAR. Optionally, the downlink control information may include one or more pieces of information of the following: the identifier of the first slice, the identifier of the first slice group, the random access resource configuration index corresponding to the first slice, or the random access resource configuration index corresponding to the first slice group. If the second slice that the terminal requests to access corresponds to the identifier of the first slice included in the downlink control information, the terminal receives the RAR. If the second slice group that the terminal requests to access corresponds to the identifier of the first slice group included in the downlink control information, the terminal receives the RAR. If an index of the random access resource configuration configured by the access network device for the second slice that the terminal requests to access corresponds to the random access resource configuration index of the first slice included in the downlink control information, the terminal receives the RAR. If an index of the random access resource configuration configured by the access network device for the second slice group that the terminal requests to access corresponds to the random access resource configuration index of the second slice group included in the downlink control information, the terminal receives the RAR.

Optionally, the downlink control information may include one or more pieces of information of the following: the identifiers of the plurality of slices, the identifiers of the plurality of slice groups, the random access resource configuration indexes corresponding to the plurality of slices, or the random access resource configuration indexes corresponding to the plurality of slice groups. If the second slice that the terminal requests to access corresponds to the identifier of the first slice in the identifiers of the plurality of slices included in the downlink control information, the terminal receives the RAR. If the second slice group that the terminal requests to access corresponds to the identifier of the first slice group in the identifiers of the plurality of slice groups included in the downlink control information, the terminal receives the RAR. If the index of the random access resource configuration configured by the access network device for the second slice that the terminal requests to access corresponds to the random access resource configuration index of the first slice in the random access resource configuration indexes of the plurality of slices included in the downlink control information, the terminal receives the RAR. If the index of the random access resource configuration configured by the access network device for the second slice group that the terminal requests to access corresponds to the random access resource configuration index of the second slice group in the random access resource configuration indexes of the plurality of slice groups included in the downlink control information, the terminal receives the RAR.

For example, it is assumed that UE_A requests to access a slice 1, UE_B requests to access a slice 2, and the UE_A and the UE_B send a same random access preamble on different random access resources (with a same RA-RNTI). After receiving the random access preamble sent by the UE_A and the UE_B, the access network device decides to respond to the UE_A, and the access network device sends downlink control information. The downlink control information includes an identifier of the slice 1. After receiving the downlink control information, both the UE_A and the UE_B can descramble the downlink control information because the UE_A and the UE_B use the same RA-RNTI. After obtaining the downlink control information, the UE_A and the UE_B know that an RAR corresponds to the identifier of the slice 1. Because the UE_A requests to access the slice 1, and the UE_B requests to access the slice 2, the UE_A knows that the RAR is sent to the UE_A, the UE_B knows that the RAR is not sent to the UE_B, and the UE_B does not occupy an Msg3 resource configured by the access network device for the UE_A.

For another example, it is assumed that UE_A requests to access a slice 1, and the slice 1 belongs to a slice group 1; and UE_B requests to access a slice 2, and the slice 2 belongs to a slice group 2. The UE_A and the UE_B send a same random access preamble on different random access resources (with a same RA-RNTI). After receiving the random access preamble sent by the UE_A and the UE_B, the access network device decides to respond to the UE_A, and the access network device sends downlink control information. The downlink control information includes an identifier of the slice group 1. After receiving the downlink control information, both the UE_A and the UE_B can descramble the downlink control information because the UE_A and the UE_B use the same RA-RNTI. After obtaining the downlink control information, the UE_A and the UE_B know that an RAR corresponds to the identifier of the slice group 1. Because the slice 1 that the UE_A requests to access belongs to the slice group 1, and the slice 2 that the UE_B requests to access belongs to the slice group 2, the UE_A knows that the RAR is sent to the UE_A, the UE_B knows that the RAR is not sent to the UE_B, and the UE_B does not occupy an Msg3 resource configured by the access network device for the UE_A.

For another example, it is assumed that UE_A requests to access a slice 1, the access network device performs random access resource configuration for the slice 1, and the random access resource configuration corresponds to an index 1. UE_B requests to access a slice 2, the access network device performs random access resource configuration for the slice 2, and the random access resource configuration corresponds to an index 2. The UE_A sends a random access preamble on a random access resource corresponding to the index 1, and the UE_B sends a random access preamble on a random access resource corresponding to the index 2. Random access preambles sent by the UE_A and the UE_B are the same, and RA-RNTIs obtained by processing based on a random access resource corresponding to the index 1 and a random access resource corresponding to the index 2 are the same. After receiving the random access preambles sent by the UE_A and the UE_B, the access network device decides to respond to the UE_A, and the access network device sends downlink control information. The downlink control information includes a random access resource configuration index 1 of the first slice. After receiving the downlink control information, both the UE_A and the UE_B can descramble the downlink control information because the UE_A and the UE_B use the same RA-RNTI. After obtaining the downlink control information, the UE_A and the UE_B know that an RAR corresponds to the random access resource configuration index 1. Because the UE_A initiates random access on a random access resource corresponding to the random access resource configuration index 1, the UE_A knows that the RAR is sent to the UE_A, the UE_B knows that the RAR is not sent to the UE_B, and the UE_B does not occupy an Msg3 resource configured by the access network device for the UE_A.

Optionally, the UE determines whether the downlink control information includes the foregoing information. If the downlink control information includes the foregoing information, the UE receives the RAR; or if the downlink control information does not include the foregoing information, the UE determines that the access network device does not send the RAR.

Optionally, it is assumed that a plurality of UEs that request to access a plurality of slices (slice groups) send a same random access preamble, and RA-RNTIs obtained by processing based on configured random access resources are the same. The access network device may include RARs for the plurality of UEs in one media access control (MAC) protocol data unit (PDU). The MAC PDU includes a plurality of media access control sub-protocol data units (MAC sub-PDUs) and padding. The padding is optional.

Figure 6:
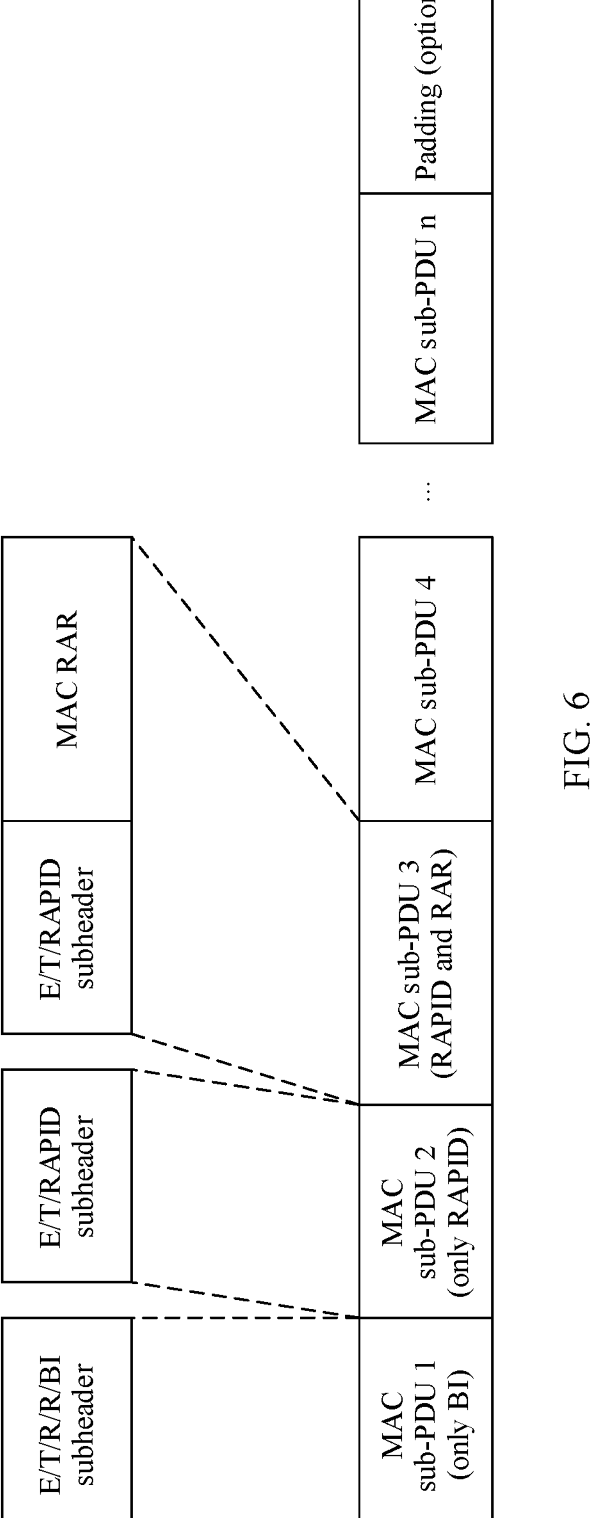
FIG. 6 is a schematic diagram of a format of a media access control protocol data unit corresponding to a random access response.

A format of the MAC PDU is shown in FIG. 6. A meaning of each field is as follows:

E: An extension field. The extension field indicates whether there is another MAC subheader behind. 1 indicates that there is another MAC subheader, and 0 indicates that there is no more MAC subheader behind.

T: A type field. The type field indicates that a MAC subheader carries a backoff indicator behind (backoff indicator, BI) or a RAPID behind. 1 indicates that the MAC subheader currently carries the RAPID behind, and 0 indicates that the MAC subheader carries the BI behind.

R: Reserved bits, which are fixedly padded with zeros.

BI: A delay in re-accessing, which is used to resend the random access preamble.

RAPID: A random access preamble identifier in an Msg1, which is used by the UE to perform matching.

A MAC subheader including a BI parameter includes E/T/R/R/BI, whereas another subheader includes E/T/RAPID.

The plurality of UEs can successfully descramble the downlink control information corresponding to the MAC PDU by using the same RA-RNTI. Each of the plurality of UEs determines that the MAC PDU is an RAR sent to the UE. However, because the MAC PDU includes MAC sub-PDUs corresponding to RARs for the plurality of UEs, each of the plurality of UEs cannot determine which MAC sub-PDU is the RAR for the UE. Therefore, in this embodiment, the access network device further sends a broadcast message, and the broadcast message includes sequence numbers of the plurality of slices or sequence numbers of the plurality of slice groups. “A plurality of” means two or more than two. The plurality of UEs receive the broadcast message, and obtain the sequence numbers of the plurality of slices or the sequence numbers of the plurality of slice groups that are included in the broadcast message. The access network device generates a MAC PDU based on the sequence numbers of the plurality of slices or the sequence numbers of the plurality of slice groups that are included in the broadcast message. Placement sequence numbers of MAC sub-PDUs in the MAC PDU are the same as the sequence numbers of the plurality of slices or the sequence numbers of the plurality of slice groups that are included in the broadcast message. After receiving the MAC PDU, each UE obtains, based on a sequence number of a slice (slice group) that the UE requests to access in the plurality of slices (slice groups), a MAC sub-PDU of the UE.

The sequence numbers of the slices (slice groups) broadcast by the access network device may be supported sequence numbers of the slices (slice groups) broadcast by the access network device, or may be sequence numbers of the slices (slice groups) in random access resource configuration indexes corresponding to different slices (slice groups) broadcast by the access network device.

In the network slicing-based random access method according to this embodiment of this application, when the terminal initiates random access based on network slicing, because a random access response corresponds to a slice, a slice group, a random access resource configuration index of the slice, or a random access resource configuration index of the slice group, the terminal may accurately identify a random access response for the terminal based on information about a slice or a slice group that the terminal requests to access, thereby improving communication reliability. Further, a network is accessed based on a random access resource configured by the network, to reduce an access delay.

When slice (slice group) UEs send a same random access preamble on different random access resources (with a same RA-RNTI), the slice (slice group) UEs may be unable to identify an RAR. When slice UE and non-slice UE send a same random access preamble on different random access resources (with a same RA-RNTI), the slice UE and the non-slice UE may also be unable to identify an RAR.

Figure 7:
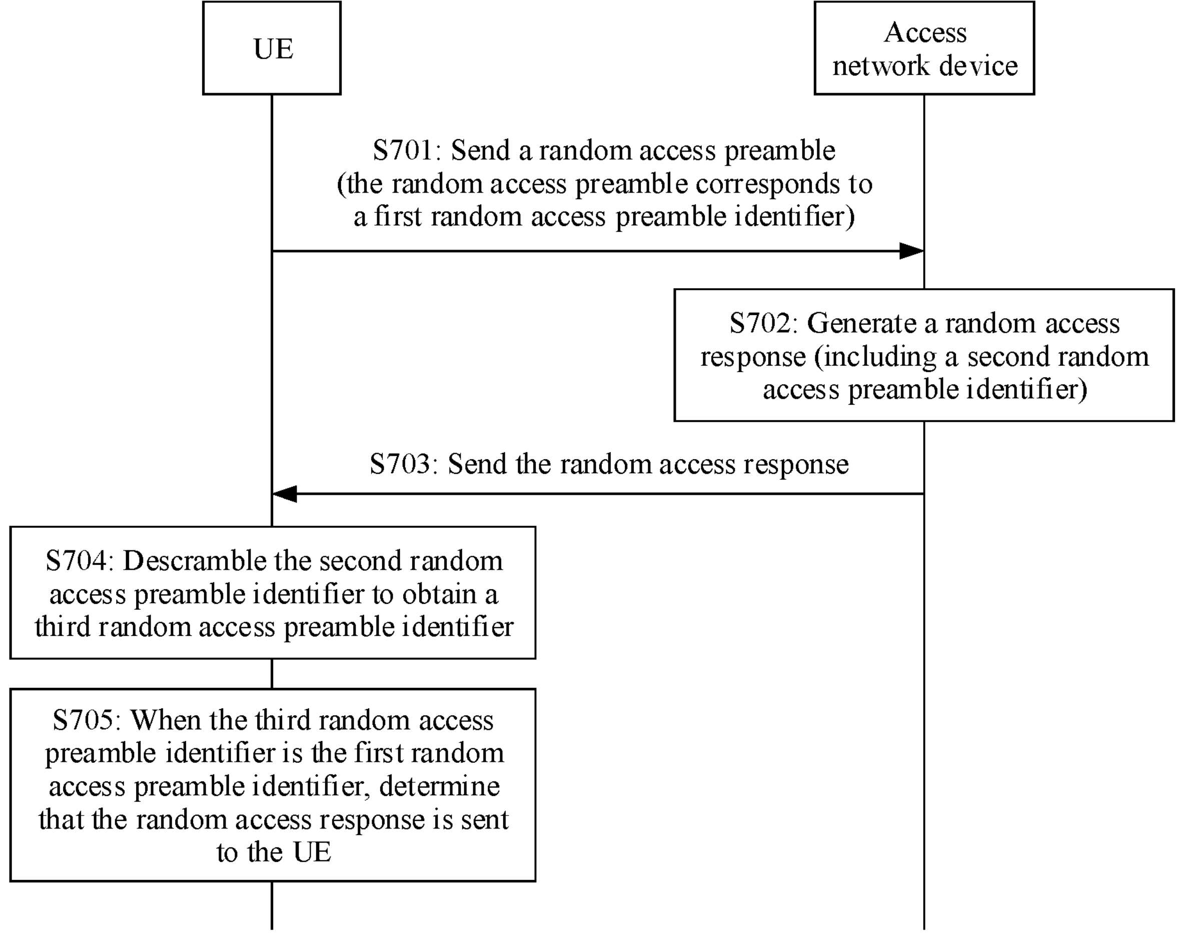
FIG. 7 is a schematic flowchart of another network slicing-based random access method according to an embodiment of this application.

Therefore, an embodiment of this application further provides a network slicing-based random access method. FIG. 7 is a schematic flowchart of another network slicing-based random access method according to an embodiment of this application. The method includes the following steps.

S701: UE sends a random access preamble. Correspondingly, an access network device receives the random access preamble.

A plurality of UEs request to access a network or a corresponding slice, and initiate random access. Specifically, a same random access preamble may be sent to the access network device on different random access resources (with a same RA-RNTI). The random access preamble corresponds to a first random access preamble identifier. To be specific, the random access preamble is identified by using the first random access preamble identifier.

S702: The access network device generates a random access response. The random access response includes a second random access preamble identifier, and the second random access preamble identifier is obtained by scrambling the first random access preamble identifier.

The access network device generates the RAR. Because random access preambles sent by the plurality of UEs are the same, and RA-RNTIs are the same, if the RAR still carries the first random access preamble identifier, the plurality of UEs cannot identify the RAR. Therefore, in this embodiment, the access network device scrambles the first random access preamble identifier to obtain the second random access preamble identifier. The RAR includes the second random access preamble identifier.

S703: The access network device sends the random access response. Correspondingly, the UE receives the random access response.

S704: The UE descrambles the second random access preamble identifier to obtain a third random access preamble identifier.

After receiving the RAR, the UE obtains the second random access preamble identifier in the RAR. If the RAR is a response to the UE, the UE may successfully descramble the second random access preamble identifier to obtain the third random access preamble identifier.

S705: When the third random access preamble identifier is the first random access preamble identifier, the UE determines that the random access response is sent to the UE.

After descrambling the second random access preamble identifier and obtaining the third random access preamble identifier, the UE determines that the third random access preamble identifier is the same as the first random access preamble identifier. The third random access preamble identifier matches the random access preamble sent by the UE, and the UE determines that the RAR is sent to the UE.

If the RAR is not sent to the UE, the UE cannot descramble the second random access preamble identifier, or the UE obtains a fourth random access preamble identifier after descrambling the second random access preamble identifier. The fourth random access preamble identifier is different from the first random access preamble identifier, and therefore the UE determines that the RAR is not sent to the UE.

The following separately describes specific implementations of this solution in a scenario in which the plurality of UEs are non-slice UE and slice UE, and a scenario in which the plurality of UEs are slice UEs.

The non-slice UE and the slice UE send a same random access preamble to the access network device on different random access resources (with a same RA-RNTI). According to the foregoing solution, the non-slice UE and the slice UE may identify whether an RAR sent by the access network device is for the non-slice UE and the slice UE.

Figure 8:
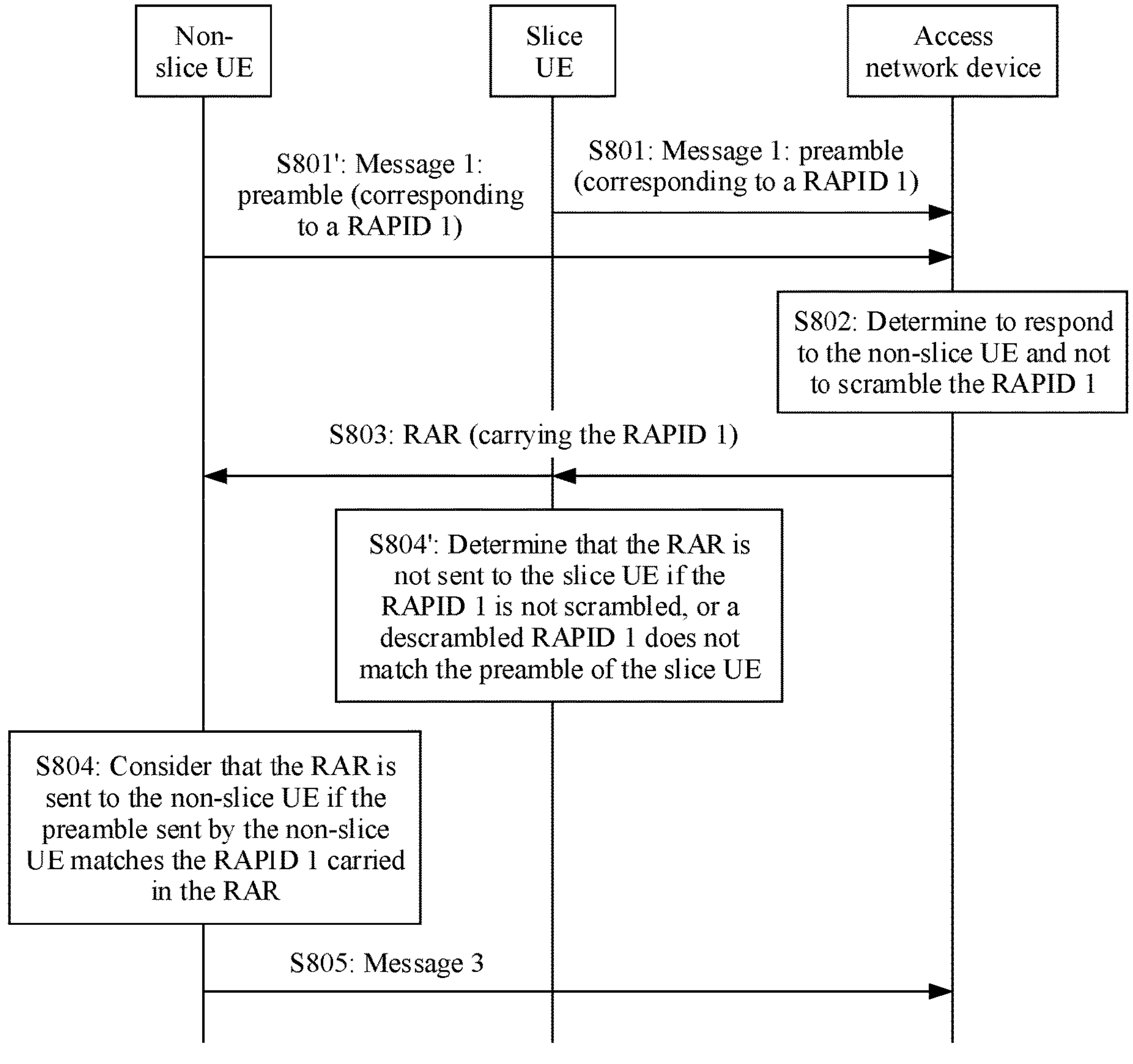
FIG. 8 is a schematic flowchart of identifying, by non-slice UE and slice UE, a random access response sent to the non-slice UE.

As shown in FIG. 8, the random access procedure includes the following steps.

S801: The slice UE sends a random access preamble.

S801': The non-slice UE sends a random access preamble.

Random access preambles sent by the slice UE and the non-slice UE are the same, and the random access preamble corresponds to a RAPID 1.

S802: The access network device may identify a UE type based on a resource position. Assuming that the access network device determines to respond to the non-slice UE, the access network device generates an RAR. When generating the RAR, the access network device does not scramble the RAPID 1. To be specific, the access network device sends the RAR according to an existing standard, and the RAR still carries the RAPID 1.

S803: The access network device sends the RAR.

S804: When the non-slice UE receives the RAR, because the random access preamble sent by the non-slice UE matches the RAPID 1 carried in the RAR, the non-slice UE determines that the RAR is sent to the non-slice UE.

S805: The non-slice UE sends an Msg3 based on the RAR.

S804': After receiving the RAR, the slice UE matches the random access preamble sent by the slice UE with the RAPID 1 carried in the RAR. Because the RAPID 1 is not scrambled, or a descrambled RAPID 1 does not match the random access preamble of the slice UE, the slice UE determines that the RAR is not sent to the slice UE, and does not incorrectly occupy a resource to send an Msg3.

Figure 9:
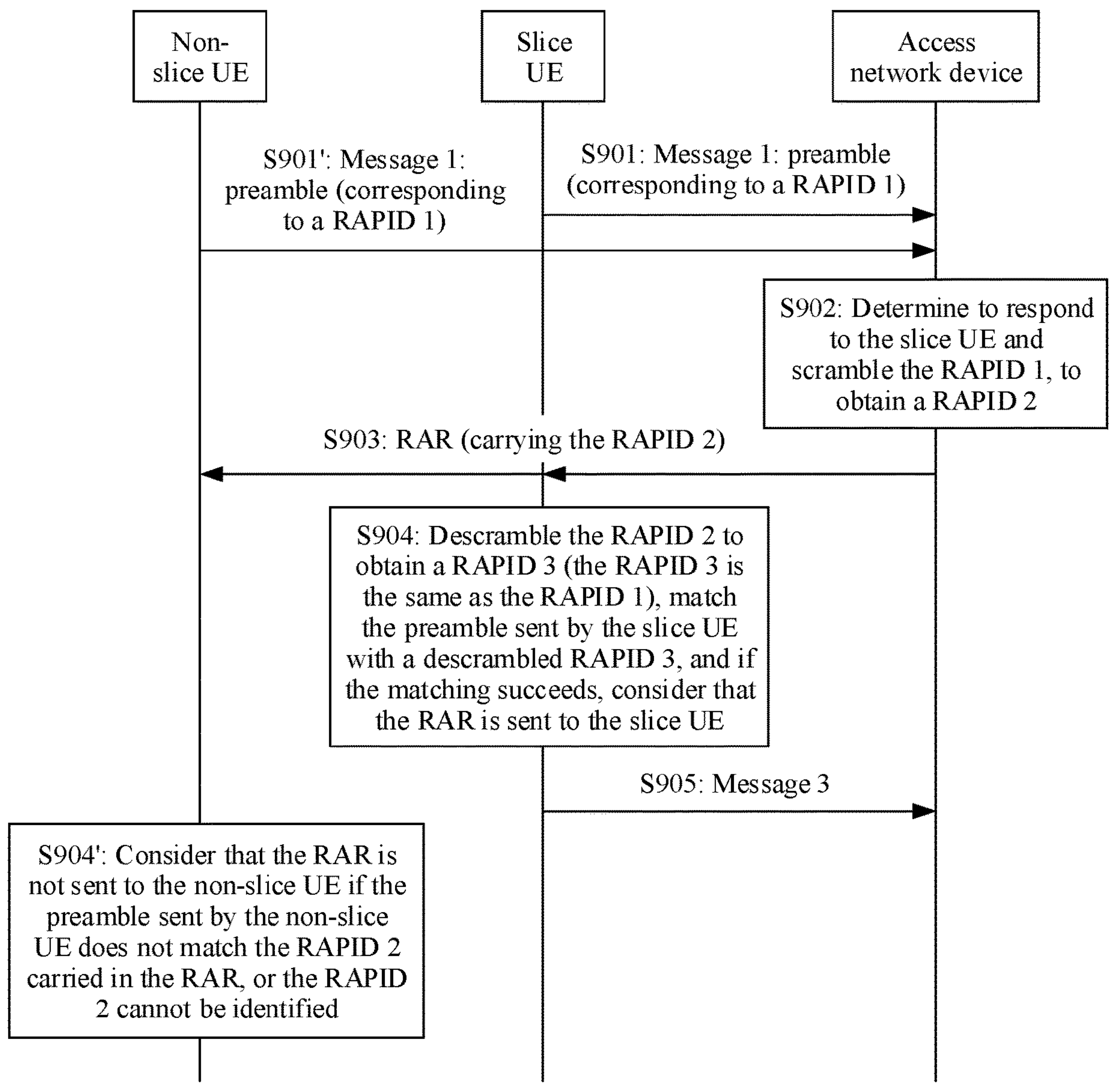
FIG. 9 is a schematic flowchart of identifying, by non-slice UE and slice UE, a random access response sent to the slice UE.

As shown in FIG. 9, the random access procedure may include the following steps.

S901: The slice UE sends a random access preamble.

S901': The non-slice UE sends a random access preamble.

Random access preambles sent by the non-slice UE and the slice UE are the same, and the random access preamble corresponds to a RAPID 1.

S902: The access network device may identify a UE type based on a resource position. Assuming that the access network device determines to respond to the slice UE, the access network device generates an RAR. When generating the RAR, the access network device scrambles the RAPID 1 to obtain a RAPID 2. For example, the access network device may scramble the RAPID 1 by using a slice type communication identifier, and the slice type communication identifier indicates that the UE requests to perform slice communication. Therefore, when determining to respond to the slice UE, the access network device may scramble the RAPID 1 by using the slice type communication identifier. The RAR carries the RAPID 2.

S903: The access network device sends the RAR.

S904: The slice UE receives the RAR, descrambles the RAPID 2 to obtain a RAPID 3 (the RAPID 3 is the same as the RAPID 1), and matches the random access preamble sent by the slice UE with the RAPID 3 obtained through descrambling. If the matching succeeds, the slice UE determines that the RAR is sent to the slice UE.

S905: The slice UE sends an Msg3 based on the RAR.

S904': When the non-slice UE receives the RAR, because the random access preamble sent by the non-slice UE does not match the RAPID 2 carried in the RAR, or the non-slice UE cannot identify the RAPID 2, the non-slice UE determines that the RAR is not sent to the non-slice UE, and does not incorrectly occupy a resource to send an Msg3.

Optionally, because a RAPID has six bits, the RAPID may be used to identify 64 random access preambles. In this case, the RAPID 2 obtained after the RAPID 1 is scrambled may correspond to a random access preamble of another non-slice UE, leading to a new random access preamble conflict problem. For example, there are the following correspondences on a same RA-RNTI: (non-slice UE 1, RAPID 1), (non-slice UE 2, RAPID 2), and (slice UE 3, RAPID 1). In order to make the non-slice UE 1 and the slice UE 3 identify a received RAR, the access network device scrambles the RAPID 1 of the slice UE 3 to obtain the RAPID 2. When the non-slice UE 1 receives the RAR, because a random access preamble sent by the non-slice UE 1 does not match the RAPID 2 carried in the RAR, or the non-slice UE 1 cannot identify the RAPID 2, the non-slice UE 1 determines that the RAR is not sent to the non-slice UE 1, and does not incorrectly occupy a resource to send an Msg3. However, when the non-slice UE 2 receives the RAR, because a random access preamble sent by the non-slice UE 2 matches the RAPID 2 carried in the RAR, the non-slice UE 2 mistakenly considers that the RAR is sent to the non-slice UE 2, and sends an Msg3 based on the RAR, thereby incorrectly occupying a resource configured by a network.

In this case, the access network device and the slice UE may configure a plurality of scrambling algorithms. When the access network device finds that a new conflict is caused by using a default scrambling algorithm, a specified scrambling algorithm is selected to reduce a conflict. Alternatively, a specified scrambling algorithm currently used by the slice UE may be indicated by downlink control information, and the slice UE descrambles, based on the indicated scrambling algorithm, the RAPID carried in the RAR.

A plurality of slice UEs send a same random access preamble to the access network device on different random access resources (with a same RA-RNTI). According to the foregoing solution, the plurality of slice UEs may identify whether an RAR sent by the access network device is for the UE.

Figure 10:
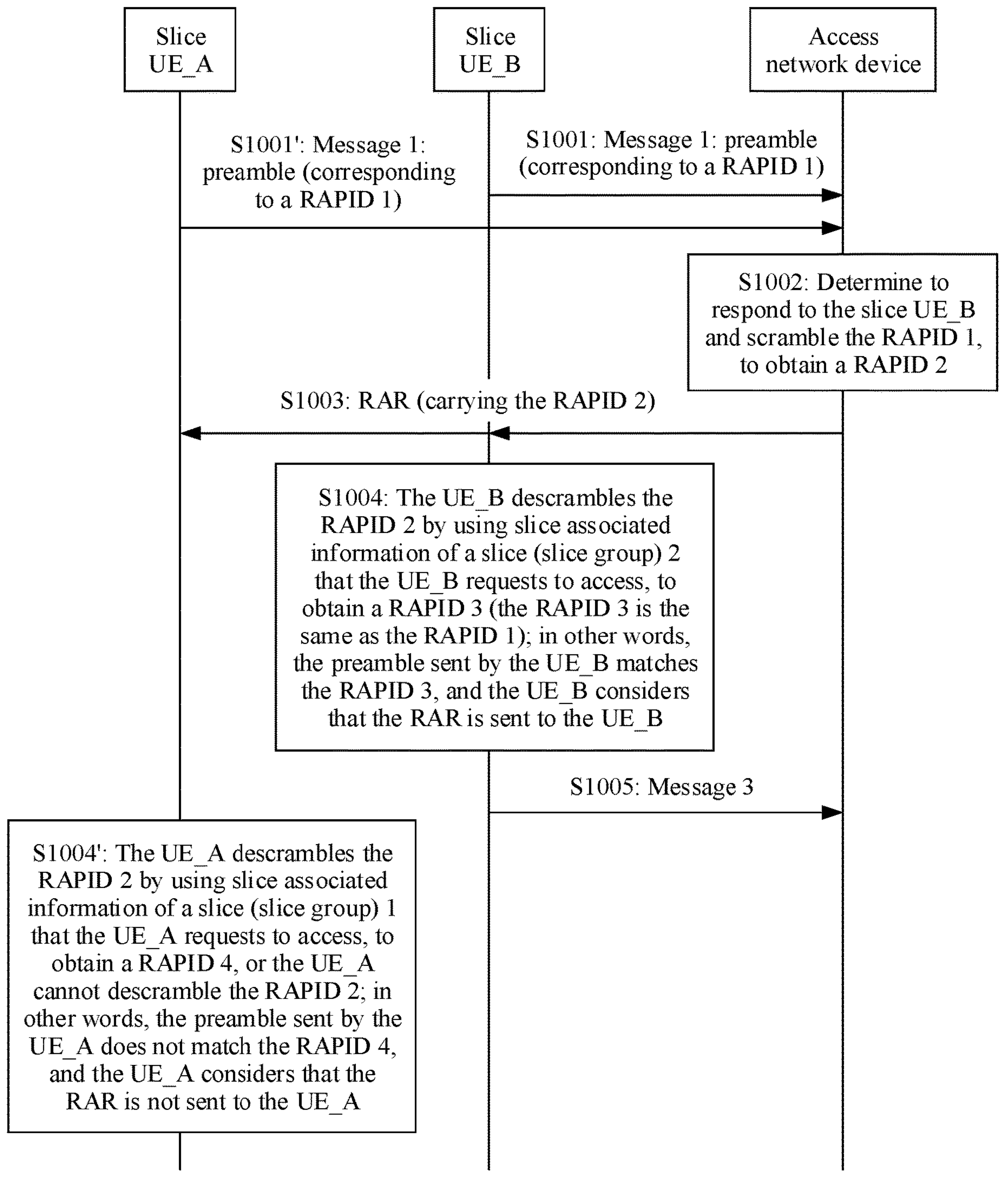
FIG. 10 is a schematic flowchart of random access responses sent by two slice UEs to the two slice UEs.

UE_A and UE_B are slice UEs. The UE_A requests to access a slice (slice group) 1, and the UE_B requests to access a slice (slice group) 2. As shown in FIG. 10, the random access procedure may include the following steps.

S1001: The UE_B sends a random access preamble to the access network device.

S1001': The UE_A sends a random access preamble to the access network device.

The UE_A and the UE_B send a same random access preamble to the access network device on different random access resources (with a same RA-RNTI), and the random access preamble corresponds to a RAPID 1.

S1002: The access network device may identify, based on a position of a random access resource, a type of a slice that the UE requests to access. Assuming that the access network device determines to respond to the UE_B, the access network device scrambles the RAPID 1 by using slice associated information of a slice that the UE_B requests to access, to obtain a RAPID 2. The slice associated information includes a slice identifier or a slice group identifier.

S1003: The access network device sends an RAR, where the RAR carries the RAPID 2.

S1004: The UE_B receives the RAR, and descrambles the RAPID 2 by using slice associated information of a slice (slice group) 2 that the UE_B requests to access, to obtain a RAPID 3 (the RAPID 3 is the same as the RAPID 1). In other words, the random access preamble sent by the UE_B matches the RAPID 3. The UE_B determines that the RAR is sent to the UE_B.

S1005: The UE_B sends an Msg3 based on the RAR.

S1004': After receiving the RAR, the UE_A descrambles the RAPID 2 by using slice associated information of a slice (slice group) 1 that the UE_A requests to access, to obtain a RAPID 4, or the UE_A cannot descramble the RAPID 2. In other words, the random access preamble sent by the UE_A does not match the RAPID 4. The UE_A determines that the RAR is not sent to the UE_A, and does not incorrectly occupy a resource to send an Msg3.

Optionally, the downlink control information or the RAR may further indicate to scramble the first random access preamble identifier. For example, the downlink control information may be one bit. When the downlink control information is a first value, the downlink control information indicates that the first random access preamble has been scrambled; and when the downlink control indication information is a second value, the downlink control information indicates that the first random access preamble is not scrambled. The downlink control information indicates to scramble the first random access preamble identifier, so that a slice type UE may further accurately descramble the second random access preamble identifier, thereby accurately receiving a random access response for the terminal.

According to the network slicing-based random access method provided in this embodiment of this application, for a slice terminal, the second random access preamble identifier in the random access response is scrambled, so that the terminal may accurately identify the random access response, thereby improving communication reliability. Further, a network is accessed based on a random access resource configured by the network, to reduce an access delay.

It may be understood that, to implement the functions in the foregoing embodiments, the access network device and the terminal include corresponding hardware structures and/or software modules for performing the functions. A person skilled in the art should be easily aware that this application can be implemented by hardware or a combination of hardware and computer software in combination with the units and the method steps in the examples described in embodiments disclosed in this application. Whether a function is performed by hardware or hardware driven by computer software depends on particular application scenarios and design constraints of the technical solutions.

Figure 11:
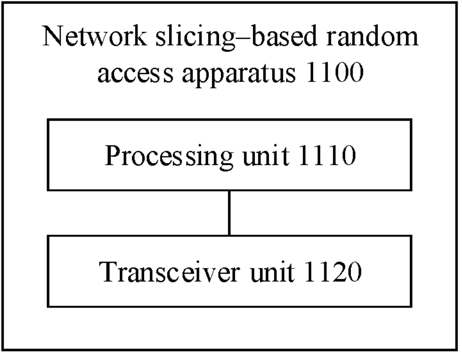
FIG. 11 is a schematic diagram of a structure of a network slicing-based random access apparatus according to an embodiment of this application.
Figure 12:
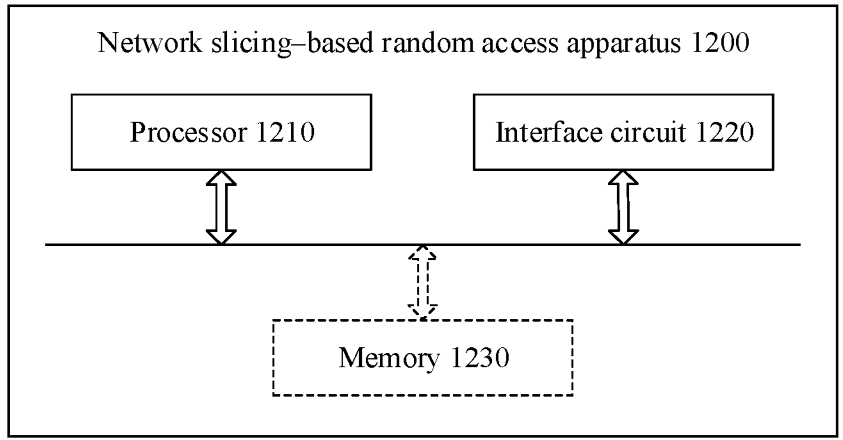
FIG. 12 is a schematic diagram of a structure of another network slicing-based random access apparatus according to an embodiment of this application.

FIG. 11 and FIG. 12 are schematic diagrams of structures of possible network slicing-based random access apparatuses according to embodiments of this application. These network slicing-based random access apparatuses may be configured to implement the functions of the terminal or the access network device in the foregoing method embodiments. Therefore, beneficial effects of the foregoing method embodiments can also be implemented. In embodiments of this application, the network slicing-based random access apparatus may be one of the terminal 320*a* to the terminal 320*j* shown in FIG. 3, or may be the access network device 310*a* or the access network device 310*b* shown in FIG. 3, or may be a module (for example, a chip) used in the terminal or the access network device.

As shown in FIG. 11, a network slicing-based random access apparatus 1100 includes: a processing unit 1110 and a transceiver unit 1120. The network slicing-based random access apparatus 1100 is configured to implement the functions of the terminal or the access network device in the method embodiments shown in FIG. 4 and FIG. 7.

When the network slicing-based random access apparatus 1100 is configured to implement the function of the terminal in the method embodiment shown in FIG. 4, the transceiver unit 1120 is configured to receive downlink control information, where the downlink control information includes at least one piece of information of the following: an identifier of a first slice, an identifier of a first slice group, a random access resource configuration index corresponding to the first slice, or a random access resource configuration index corresponding to the first slice group. A random access response corresponds to the first slice, the first slice group, the random access resource configuration index of the first slice, or the random access resource configuration index of the first slice group. The transceiver unit 1120 is configured to receive the random access response if a second slice or a second slice group that the apparatus requests to access corresponds to the at least one piece of information included in the downlink control information. Further, the transceiver unit 1120 is further configured to receive a broadcast message, and the broadcast message includes sequence numbers of a plurality of slices or sequence numbers of a plurality of slice groups. The transceiver unit 1120 is further configured to receive the random access response, where the random access response includes media access control sub-protocol data units MAC sub-PDUs of random access responses corresponding to the plurality of slices or the plurality of slice groups. The processing unit 1110 is configured to obtain, based on a sequence number of a slice that the apparatus requests to access in the plurality of slices or a sequence number of a slice group that the apparatus requests to access in the plurality of slice groups, a MAC sub-PDU of a random access response corresponding to the slice or the slice group that the apparatus requests to access.

When the network slicing-based random access apparatus 1100 is configured to implement the function of the access network device in the method embodiment shown in FIG. 4, the transceiver unit 1120 is configured to send downlink control information, where the downlink control information includes at least one piece of information of the following: an identifier of a first slice, an identifier of a first slice group, a random access resource configuration index corresponding to the first slice, or a random access resource configuration index corresponding to the first slice group. A random access response corresponds to the first slice, the first slice group, the random access resource configuration index of the first slice, or the random access resource configuration index of the first slice group. The transceiver unit 1120 is further configured to send the random access response. Further, the transceiver unit 1120 is further configured to send a broadcast message, and the broadcast message includes sequence numbers of a plurality of slices or sequence numbers of a plurality of slice groups. The random access response includes media access control sub-protocol data units MAC sub-PDUs of random access responses corresponding to the plurality of slices or the plurality of slice groups.

For more detailed descriptions of the processing unit 1110 and the transceiver unit 1120, directly refer to related descriptions in the method embodiment shown in FIG. 4. Details are not described herein again.

When the network slicing-based random access apparatus 1100 is configured to implement the function of the terminal in the method embodiment shown in FIG. 7, the transceiver unit 1120 is configured to send a random access preamble, where the random access preamble corresponds to a first random access preamble identifier. The transceiver unit 1120 is further configured to receive a random access response, the random access response includes a second random access preamble identifier, and the second random access preamble identifier is obtained by scrambling the first random access preamble identifier. The processing unit 1110 is configured to descramble the second random access preamble identifier, to obtain a third random access preamble identifier. The processing unit 1110 is further configured to: when the third random access preamble identifier is the first random access preamble identifier, determine that the random access response is sent to the processing unit 1110. Further, the processing unit 1110 is further configured to descramble the second random access preamble identifier based on slice associated information corresponding to the processing unit 1110, to obtain the third random access preamble identifier. Further, the transceiver unit 1120 is further configured to receive downlink control information, where the downlink control information indicates to scramble the first random access preamble identifier.

When the network slicing-based random access apparatus 1100 is configured to implement the function of the access network device in the method embodiment shown in FIG. 7, the transceiver unit 1120 is configured to receive a random access preamble, where the random access preamble corresponds to a first random access preamble identifier. The processing unit 1110 is configured to generate a random access response, where the random access response includes a second random access preamble identifier, and the second random access preamble identifier is obtained by scrambling the first random access preamble identifier. The transceiver unit 1120 is further configured to send the random access response. Further, the transceiver unit 1120 is further configured to send downlink control information, where the downlink control information indicates to scramble the first random access preamble identifier.

For more detailed descriptions of the processing unit 1110 and the transceiver unit 1120, directly refer to related descriptions in the method embodiment shown in FIG. 7. Details are not described herein again.

As shown in FIG. 12, a network slicing-based random access apparatus 1200 includes a processor 1210 and an interface circuit 1220. The processor 1210 and the interface circuit 1220 are coupled to each other. It may be understood that the interface circuit 1220 may be a transceiver or an input/output interface. Optionally, the network slicing-based random access apparatus 1200 may further include a memory 1230, configured to store instructions executed by the processor 1210, or store input data required by the processor 1210 to run instructions, or store data generated after the processor 1210 runs instructions.

When the network slicing-based random access apparatus 1200 is configured to implement the method shown in FIG. 4 or FIG. 7, the processor 1210 is configured to implement the functions of the foregoing processing unit 1110, and the interface circuit 1220 is configured to implement the functions of the foregoing transceiver unit 1120.

When the foregoing network slicing-based random access apparatus is a chip used in a terminal, the chip in the terminal implements the functions of the terminal in the foregoing method embodiments. The chip in the terminal receives information from another module (for example, a radio frequency module or an antenna) in the terminal, and the information is sent by an access network device to the terminal; or the chip in the terminal sends information to another module (for example, a radio frequency module or an antenna) in the terminal, and the information is sent by the terminal to an access network device.

When the foregoing network slicing-based random access apparatus is a chip used in an access network device, the chip in the access network device implements the functions of the access network device in the foregoing method embodiments. The chip in the access network device receives information from another module (for example, a radio frequency module or an antenna) in the access network device, and the information is sent by a terminal to the access network device; or the chip in the access network device sends information to another module (for example, a radio frequency module or an antenna) in the access network device, and the information is sent by the access network device to a terminal.

It may be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments of this application may be implemented by hardware, or may be implemented by the processor executing software instructions. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or a storage medium in any other form well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in the access network device or the terminal. Certainly, the processor and the storage medium may exist in the access network device or the terminal as discrete components.

All or some of the foregoing embodiments may be implemented by using software, hardware, firmware, or any combination thereof. When software is used to implement embodiments, all or some of embodiments may be implemented in a form of a computer program product. The computer program product includes one or more computer programs or instructions. When the computer programs or instructions are loaded and executed on a computer, all or some of the procedures or the functions in embodiments of this application are performed. The computer may be a general-purpose computer, a special-purpose computer, a computer network, an access network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible to a computer, or a data storage device, for example, a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. In addition, "and/or" describes an association relationship between associated objects, and indicates that three relationships may exist. For example, A and/or B may indicate the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects. In this application, "first" and "second" are merely examples, and there may be one or more "first" and "second". "First" and "second" are merely used to distinguish between objects of a same type. A first object and a second object may be a same object, or may be different objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. A method applied to a terminal, the method comprising:

receiving downlink control information comprising at least one piece of information of the following:

an identifier of a first slice, an identifier of a first slice group, a random access resource configuration index corresponding to the first slice, or a random access resource configuration index corresponding to the first slice group;

receiving a broadcast message comprising sequence numbers of a plurality of slices or sequence numbers of a plurality of slice groups; and receiving a random access response in response to a second slice or a second slice group that the terminal requests to access corresponding to the at least one piece of information comprised in the downlink control information, wherein the random access response corresponds to the first slice, the first slice group, the random access resource configuration index of the first slice, or the random access resource configuration index of the first slice group, wherein the random access response comprises media access control sub-protocol data units (MAC sub-PDUs) of random access responses corresponding to the plurality of slices or the plurality of slice groups.

2. The method according to claim 1, wherein receiving the random access response further comprises:

obtaining, based on a sequence number of a slice that the terminal requests to access in the plurality of slices or a sequence number of a slice group that the terminal requests to access in the plurality of slice groups, a MAC sub-PDU of a random access response corresponding to the slice or the slice group that the terminal requests to access.

3. The method according to claim 1, wherein the downlink control information and the random access response are received from an access network device.

4. The method according to claim 3, further comprising sending a random access preamble to the access network device before receiving the random access response.

5. The method according to claim 4, wherein the random access preamble is based on the random access resource configuration index corresponding to the first slice or the random access resource configuration index corresponding to the first slice group.

6. The method according to claim 1, wherein the random access response is received over a physical downlink shared channel (PDSCH).

7. The method according to claim 6, wherein:

the downlink control information further comprises a time-frequency resource position for receiving the random access response; and receiving the random access response comprises receiving the random access response on the time-frequency resource position.

8. A network slicing-based random access method applied to a access network device, comprising:

sending downlink control information comprising at least one piece of information of the following: an identifier of a first slice, an identifier of a first slice group, a random access resource configuration index corresponding to the first slice, or a random access resource configuration index corresponding to the first slice group;

sending a broadcast message comprising sequence numbers of a plurality of slices or sequence numbers of a plurality of slice groups; and sending a random access response, wherein the random access response corresponds to the first slice, the first slice group, the random access resource configuration index of the first slice, or the random access resource configuration index of the first slice group, and wherein the random access response comprises media access control sub-protocol data units (MAC sub-PDUs) of random access responses corresponding to the plurality of slices or the plurality of slice groups.

9. The method according to claim 8, wherein the downlink control information and the random access response are sent to a terminal.

10. The method according to claim 9, further comprising receiving a random access preamble from the terminal before sending the random access response to the terminal.

11. The method according to claim 10, wherein the random access preamble is based on the random access resource configuration index corresponding to the first slice or the random access resource configuration index corresponding to the first slice group.

12. The method according to claim 8, wherein the random access response is sent over a physical downlink shared channel (PDSCH).

13. The method according to claim 12, wherein:

the downlink control information further comprises a time-frequency resource position for receiving the random access response; and sending the random access response comprises sending the random access response on the time-frequency resource position.

14. An apparatus, comprising:

at least one processor; and a non-transitory computer-readable medium including computer-executable instructions that, when executed by the at least one processor, cause the apparatus to perform a method including:

receiving downlink control information comprising at least one piece of information of the following: an identifier of a first slice, an identifier of a first slice group, a random access resource configuration index corresponding to the first slice, or a random access resource configuration index corresponding to the first slice group;

receiving a broadcast message comprising sequence numbers of a plurality of slices or sequence numbers of a plurality of slice groups; and receiving a random access response in response to a second slice or a second slice group that the apparatus requests to access corresponding to the at least one piece of information comprised in the downlink control information, wherein the random access response corresponds to the first slice, the first slice group, the random access resource configuration index of the first slice, or the random access resource configuration index of the first slice group, wherein the random access response comprises media access control sub-protocol data units (MAC sub-PDUs) of random access responses corresponding to the plurality of slices or the plurality of slice groups.

15. The apparatus according to claim 14, wherein the computer-executable instructions that cause the apparatus to perform the receiving the random access response include instructions that cause the apparatus to perform:

obtaining, based on a sequence number of a slice that the apparatus requests to access in the plurality of slices or a sequence number of a slice group that the apparatus requests to access in the plurality of slice groups, a MAC sub-PDU of a random access response corresponding to the slice or the slice group that the apparatus requests to access.

16. The apparatus according to claim 14, wherein the downlink control information and the random access response are received from an access network device.

17. The apparatus according to claim 16, wherein the computer-executable instructions, when executed by the at least one processor, further cause the apparatus to perform:

sending a random access preamble to the access network device before receiving the random access response.

18. The apparatus according to claim 17, wherein the random access preamble is based on the random access resource configuration index corresponding to the first slice or the random access resource configuration index corresponding to the first slice group.

19. The apparatus according to claim 14, wherein the random access response is received over a physical downlink shared channel (PDSCH).

* * * * *